United States Patent
Yahav et al.

(10) Patent No.: US 9,791,932 B2
(45) Date of Patent: Oct. 17, 2017

(54) SEMAPHORE GESTURE FOR HUMAN-MACHINE INTERFACE

(75) Inventors: Giora Yahav, Haifa (IL); Uri Goren, Haifa (IL); Yuval Bahat, Tel Aviv (IL); Omri Mendels, Tel Aviv (IL); Bella Specktor, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/405,365

(22) Filed: Feb. 27, 2012

(65) Prior Publication Data

US 2013/0227477 A1    Aug. 29, 2013

(51) Int. Cl.
*G06F 3/048* (2013.01)
*G06F 3/033* (2013.01)
*G06F 3/01* (2006.01)
*G06F 3/023* (2006.01)
*G06F 3/0484* (2013.01)

(52) U.S. Cl.
CPC ............ *G06F 3/017* (2013.01); *G06F 3/0236* (2013.01); *G06F 3/04842* (2013.01)

(58) Field of Classification Search
CPC ............ H04N 21/4316; H04N 21/482; H04N 5/44543; H04N 5/4403; H04N 21/4622; H04N 5/44582; H04N 21/42204; G06F 3/048; G06F 3/033; G06F 3/017
USPC ............ 715/810, 863; 341/176; 348/E5.103, 348/E5.105, E5.099
See application file for complete search history.

(56) References Cited

U.S. PATENT DOCUMENTS

| | | |
|---|---|---|
| 2002/0077143 A1* | 6/2002 | Sharif et al. .................. 455/550 |
| 2003/0153378 A1* | 8/2003 | Schlegel ................ G07F 17/32 463/16 |
| 2004/0029611 A1* | 2/2004 | Nagao ........................ 455/550.1 |
| 2007/0130547 A1 | 6/2007 | Boillot |
| 2007/0180389 A1* | 8/2007 | Holm et al. .................. 715/764 |
| 2009/0027337 A1* | 1/2009 | Hildreth ........................ 345/158 |
| 2009/0103780 A1 | 4/2009 | Nishihara et al. |
| 2009/0213079 A1* | 8/2009 | Segal et al. .................... 345/169 |
| 2009/0249258 A1* | 10/2009 | Tang .................. G06F 3/04883 715/863 |
| 2010/0229125 A1* | 9/2010 | Cha .............................. 715/828 |
| 2011/0041100 A1 | 2/2011 | Boillot |
| 2011/0063224 A1 | 3/2011 | Vexo et al. |
| 2012/0093360 A1* | 4/2012 | Subramanian et al. ...... 382/103 |
| 2013/0194187 A1* | 8/2013 | Pasquero et al. ............. 345/168 |

OTHER PUBLICATIONS

Mark Billinghurst; Gesture based Interaction; Published Date: Aug. 24, 2011; http://www.billbuxton.com/input14.Gesture.pdf.

(Continued)

*Primary Examiner* — Sang H Kim
(74) *Attorney, Agent, or Firm* — A.C. Entis-IP Ltd.

(57) ABSTRACT

An embodiment of the invention provides a gesture recognition system (GRS) that displays a graphical user interface in which symbols are grouped into "pods" on a display screen, and a user enters a desired symbol into a computer by selecting a pod containing the desired symbol, and then selecting the symbol from a display of the symbols in the selected pod using hand motions without having to contact the display screen or use a manual controller.

13 Claims, 6 Drawing Sheets

(56) References Cited

OTHER PUBLICATIONS

Yang Liu et al; Hand-Gesture Based Text Input for Wearable Computers; ICVS '06 Proceedings of the Fourth IEEE International Conference on Computer Vision Systems; Published Date: Jan. 4-7, 2007; http://mcislab.cs.bit.edu.cn/paper/lab/pdf/link32-1.pdf.
Francis Quek; Gesture and Interaction; Published Date: Nov. 23, 2011; pp. 288-292; http://vislab.cs.vt.edu/~quek/Classes/Aware+EmbodiedInteraction/PAPERS/Que04.pdf.

* cited by examiner

SEMAPHORE GESTURE FOR HUMAN-MACHINE INTERFACE

TECHNICAL FIELD

Embodiments of the invention relate to gesture recognition systems for human-machine interfaces.

BACKGROUND

People generally interact with computers through a keyboard and a mouse to enter alphanumeric data such as text, and/or to identify objects of interest on a computer screen. On the other hand, people commonly interact with one another by using gestures, for example, by shaking one's head to indicate "no", or by pointing to an object of interest. Gesturing and using body language are often faster methods of transmitting data than pressing buttons, operating joy sticks, writing, and talking. Gestures and body language convey pictures. The human mind processes pictures much faster than it processes written or audible strings of words, and communicating by gesturing is a natural and preferred method of interfacing with other people and rapidly transmitting to them relatively large amounts of data. How many written or voiced words might be required to transmit the information in a frown, a skewed smile, a raised eyebrow, or a dismissive throw of the hand? And how long would it take to decode the words?

As computers and computer aided devices, such as household appliances, gaming consoles, and industrial equipment, have become ever more common and natural features of the modern environment, communicating with them, and through them, has become incessant. Communicating through keyboards and mice for an increasing number of applications often appear too slow and encumbering. Communicating with them by gesturing may increase speed and ease with which people can transmit data to them, "feels" natural, and has become increasingly attractive. However, computers are not animate and do not "read" people like people read people, and configuring effective and comfortable human-machine interfaces that support entering data to a computer by gesturing has proven to be challenging.

SUMMARY

An aspect of an embodiment of the invention, relates to providing a gesture recognition system (GRS) that enables a user to enter symbols to a computer by selecting symbols from a display screen using hand motions without having to contact the screen or use a manual controller. The symbols, which may for example be letters of the alphabet, numbers, arithmetic symbols, punctuation symbols, various icons, or control symbols, are arranged and displayed on the screen in a graphical user interface (GUI) comprising a plurality of groups, hereinafter also referred to as "pods", or "symbol pods". Optionally, a symbol pod comprises a localized background on which the symbols are presented that visually distinguishes the symbols in the pod as a group and/or a frame that surrounds and "encapsulates" the symbols in the pod.

An imaging system in the GRS images the user to recognize the user's hands and determine and track their spatial locations in a field of view (FOV) of the imaging system. In an embodiment of the invention, a first hand motion tracked by the imaging system selects a desired symbol pod from the GUI. The symbols in the selected symbol pod are displayed on the screen optionally outside the pod and enlarged to enable a second hand motion tracked by the imaging system to relatively easily select one of the symbols for entering into the computer.

A GUI in accordance with an embodiment of the invention may comprise any number of pods and symbols per pod useable to select and enter symbols into a computer using gestures. By way of example, the GUI may comprise 4, 5, 6, or more pods have 3 or more symbols per pod. A suitable gesture and/or selecting a control symbol from a symbol pod may be used to change a set of symbols displayed in the symbol pods to a different set of symbols. Optionally, selected symbols, after selection, are presented on a tickertape type, text banner, on the screen.

In an embodiment of the invention, icons representing the user's hands are shown on the screen at screen locations that correspond to the locations of the hands in the imaging system FOV. The hand icons are shown on the screen relative to the locations of the displayed pods, and provide visual feedback to the user to aid him or her in moving a hand relative to the symbol pods. Optionally audio signals accompany movement of hand icons to provide auditory feedback to the user.

In an embodiment of the invention, the GRS is configured to connect to an, optionally wireless, manual controller and switch from a gesture recognition mode of operation to a manual controller operating mode. In the manual controller operating mode a user operates the manual controller to select symbols from the symbol pods displayed on the screen and enter them into the computer.

In the discussion, unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

Figure 1A:
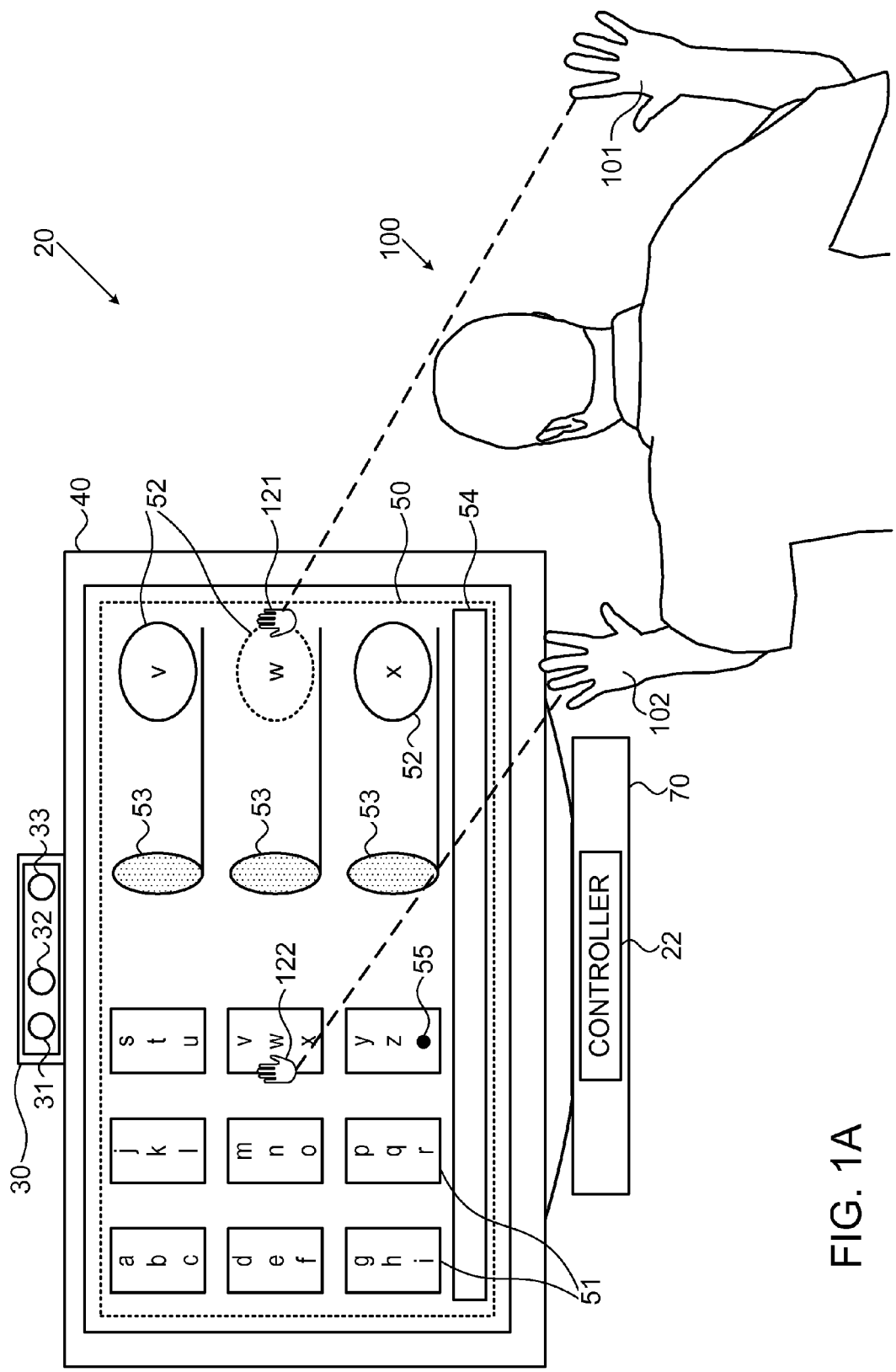
FIGS. 1A and 1B schematically show a user using a gesture recognition system (GRS) to enter text to a computer, in accordance with an embodiment of the invention.
Figure 1B:
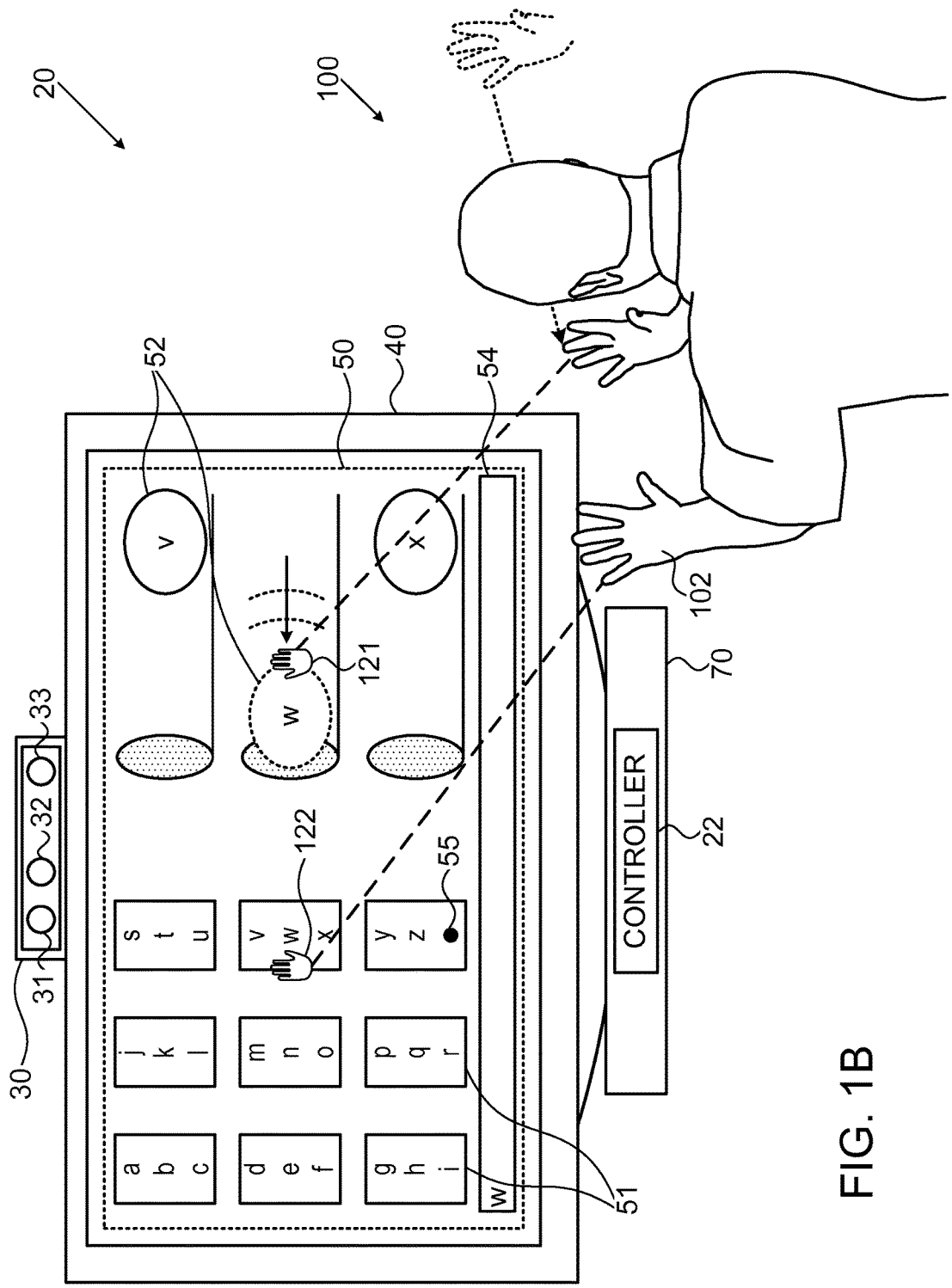
Figure 2A:
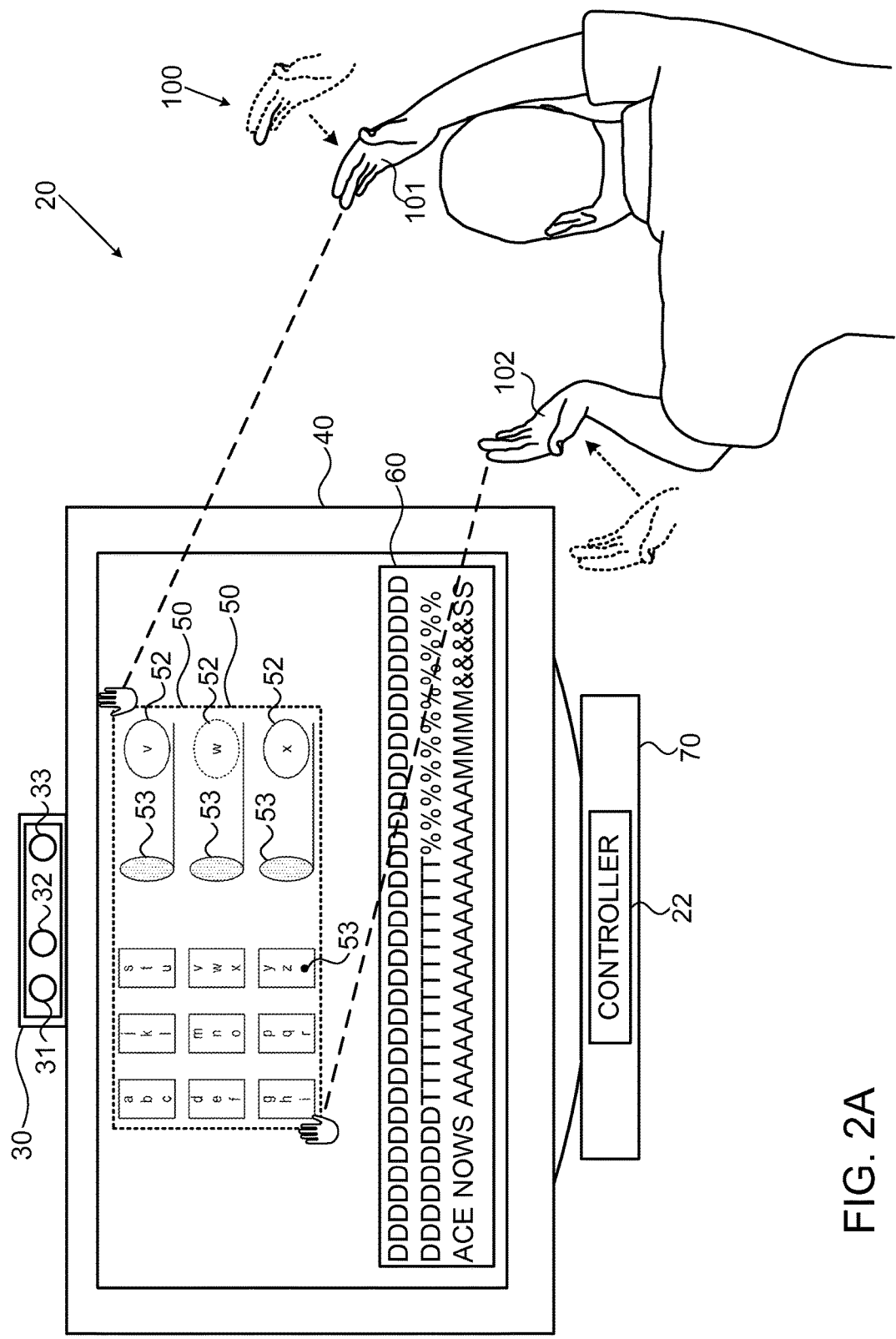
FIGS. 2A and 2B schematically shows a user gesturing to the GRS shown in FIGS. 1A and 1B to change a display of symbol pods, in accordance with an embodiment of the invention.
Figure 2B:
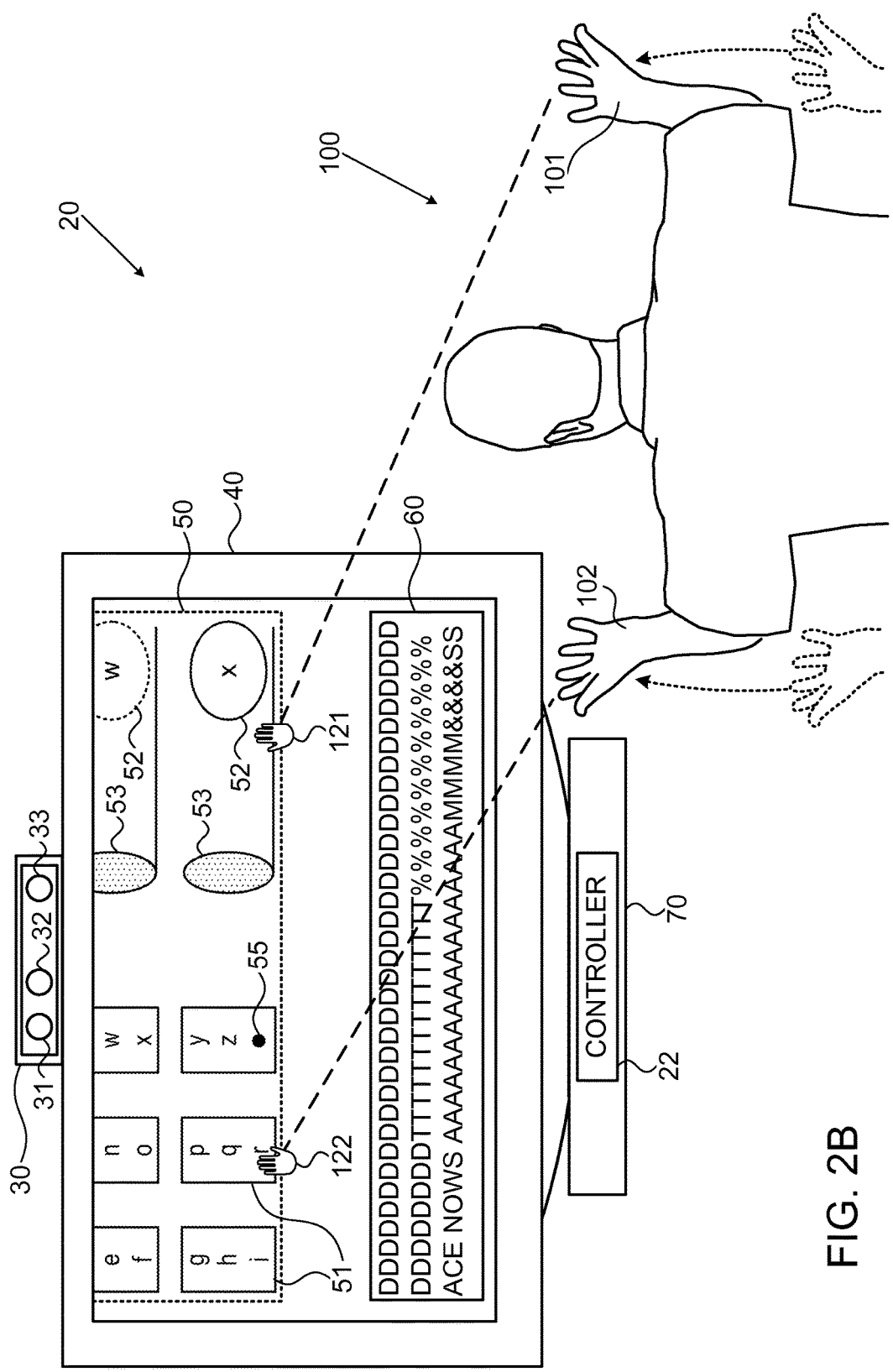
Figure 3:
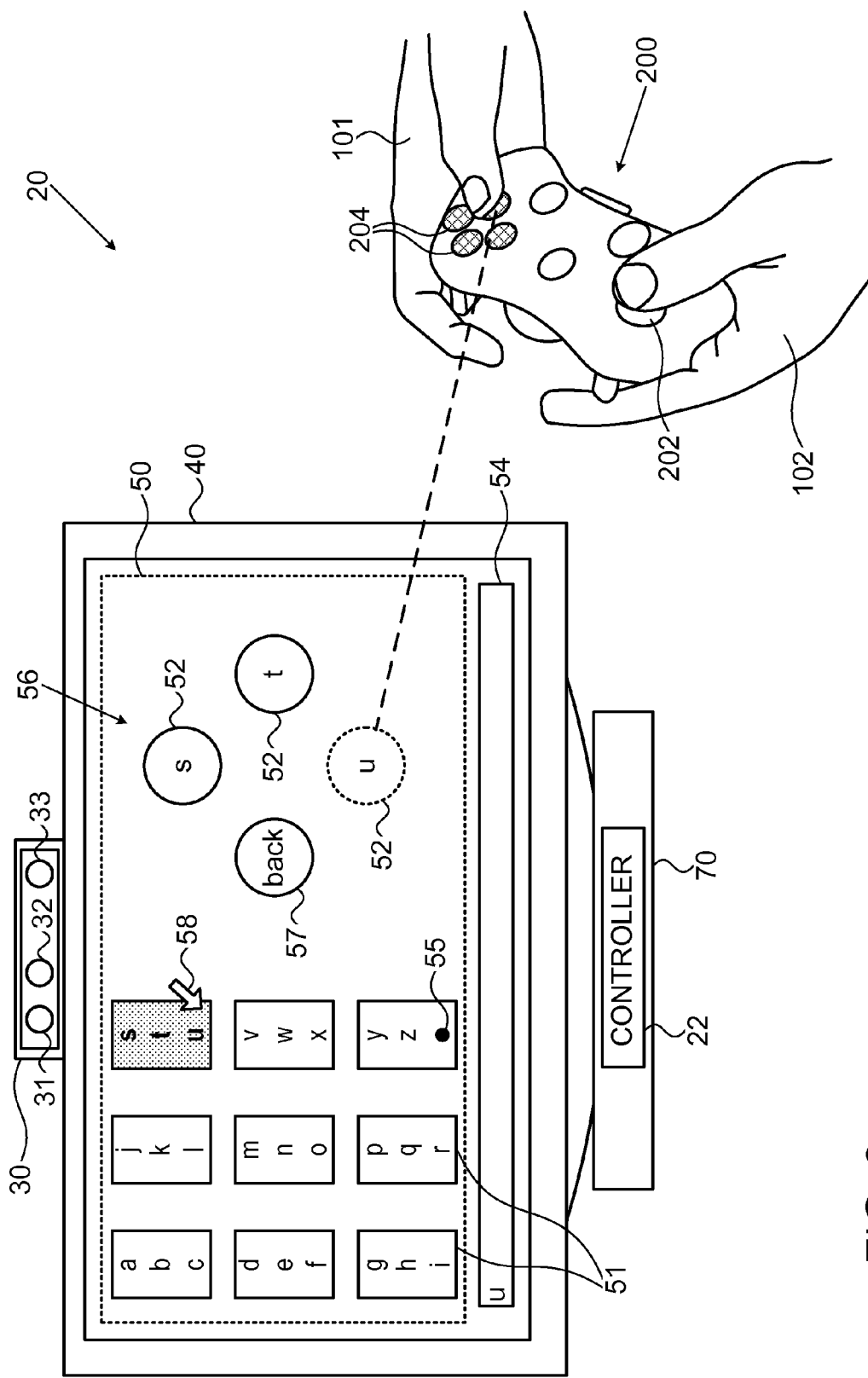
FIG. 3 schematically shows a user controlling a GRS to enter text into a computer using a manual controller, in accordance with an embodiment of the invention.

The detailed description below describes a user using a GRS, in accordance with an embodiment of the invention, to enter text into a computer by gesturing with his right and left hands. The hand gestures select letters from symbol pods displayed in a GUI on a display screen and deposit them into "deposit slots" shown in the GUI to enter them into the computer. FIGS. 1A and 1B illustrate performance of the gestures. FIGS. 2A and 2B schematically show the user gesturing to the GRS to reconfigure the GUI so that an increased area of the display is available for viewing text entered into the computer. In an embodiment of the invention, the GRS is configured to operate in a manual controller operating mode, and FIG. 3 schematically shows a user controlling the GRS using a manual video game controller to enter symbols from symbol pods into a computer.

FIGS. 1A and 1B schematically show a user 100 having a right hand 101 and a left hand 102 using a GRS 20 to enter symbols into a computer 70, in accordance with an embodiment of the invention. GRS 20 optionally comprises an imaging system 30 for acquiring images of user 100, a display screen 40, and a GRS controller 22. GRS controller 22 may be a stand alone controller or, as shown in FIGS. 1A and 1B and figures that follow, may be included in computer 70 and may for example comprise a computer executable instruction set that a processor (not shown) in the computer executes to provide GRS controller functionalities described below.

GRS controller 22 operates to present a display 50, hereinafter also referred to as a "graphical user interface (GUI) 50", schematically delineated by a dashed rectangle and optionally comprising a plurality of symbol pods 51, a set of symbol tokens 52, and a set of deposit slots 53 on screen 40. Optionally, symbol pods 51 are rectangular and are configured in a rectangular array of rows and columns. Symbol tokens 52 and deposit slots 53 are optionally elliptical and each symbol token 52 is associated with a deposit slot 53 immediately to its left in display 50. In an embodiment, GRS controller 22 also displays a text banner 54 for displaying symbols that user 100 enters into computer 70. Each pod 51 may comprise three symbols. By way of example, in FIG. 1A, symbol pods 51 show a menu of symbols comprising the lower case letters of the English language and a shift button 55.

Imaging system 30 optionally comprises a camera 31 that acquires contrast images of user 100, a three dimensional (3D) camera 32 that acquires range images of user 100, which provide distances to features of user 100 from the imaging system, and a light source 33. Light source 33 illuminates user 100, optionally with infrared (IR) light, that camera 31 and 3D camera 32 image to acquire contrast and range images respectively. Optionally, 3D camera 32 comprises a time-of-flight (TOF) 3D camera that determines distances to features of user 100 responsive to a round trip transit time of IR light from light source 33 to the features and back to imaging system 30.

GRS controller 22 processes contrast images acquired by camera 31 and range images acquired by 3D camera 32 to identify the user's right and left hands 101 and 102 and to determine spatial locations of hands 101 and 102 in a region of space delimited by a FOV (not shown) of imaging system 30 in front of display screen 40. GRS controller 22 displays a right hand icon 121 and a left hand icon 122 respectively representing right and left hands 101 and 102 of user 100 at locations in GUI 50 that correspond to the determined spatial locations of the hands. As user 100 moves his hands 101 and 102, GRS controller 22 processes images of user 100 acquired by imaging system 30 to determine changes in the spatial location of the hands and move hand icons 121 and 122 in GUI 50 in response to the changes.

To enter a letter in computer 70, user 100 optionally moves his left hand 102 to cause GRS 20 to move left hand icon 122 to indicate a symbol pod 51 containing a letter that the user wants to enter into computer 70. Left hand icon 122 may indicate a symbol pod 51 optionally by being moved to a close neighborhood of the symbol pod, by touching the symbol pod, or pointing to the symbol pod. Upon left hand icon 122 indicating the desired symbol pod 51, GRS 20 displays each of the letters in the touched symbol pod in a different one of symbol tokens 52. By way of example, in FIG. 1A user 100 has moved his left hand so that left hand icon 122 touches the symbol pod 51 containing the letters "v", "w" and "x", and the letters "v", "w" and "x" are shown separately in different symbol tokens 52. To select a letter from among the letters shown in symbol tokens 52 user 100 optionally moves his right hand 101 to move right hand icon 121 to indicate, optionally by touching, symbol token 52 containing the desired letter. In FIG. 1 the desired letter is "w", and user 100 is shown having moved right hand 101 to touch symbol token 52 containing the letter "w" with right hand icon 121.

Whereas in FIG. 1A user 100 is shown having successfully gestured to GRS 20 to select the letter w, he has not as yet in FIG. 1A entered w into computer 70. To enter the letter w into computer 70, in accordance with an embodiment of the invention user 100 moves his right hand 101 to simulate pushing symbol token 52 containing the letter w to the left, to deposit the symbol token in its associated deposit slot 53. FIG. 1B schematically shows user 100 moving right hand icon 121 "to deposit" symbol token 52 containing the letter w into deposit slot 53 associated with the symbol token. Upon user 100 depositing symbol token 52 containing the letter w into deposit slot 53, GRS controller 22 displays the letter w in text banner 54.

It is noted that whereas in FIGS. 1A and 1B user 100 simulates depositing a symbol token 52 into a deposit slot 53 to enter a letter into computer 70, embodiments of the invention are not limited to having a user deposit a symbol token into a deposit slot to enter a letter into a computer. For example, user 100 may enter the letter w into computer 70 just by choosing symbol token 52 comprising the letter w, by executing a punching motion towards screen 40 or "clenching" a hand after choosing symbol token 52 containing the letter w.

In the format of GUI 50 shown in FIGS. 1A and 1B, GRS 20 displays at any one time at most twenty seven symbols, and in the figures GRS 20 shows the twenty six lower case letters of the English alphabet and shift button 55 in symbol pods 51. However, users typically use many more symbols than the twenty six lower case letters of the English language to communicate written messages. English speakers require at least fifty two symbols just to accommodate lower and upper case letters, and a conventional computer keyboard typically comprises between one hundred and one to one hundred and four keys to provide symbols for generating text. Selecting and, optionally, depositing shift button 55 into a deposit slot 53 changes a menu of symbols displayed in symbol pods 51 to a different menu. For example, selecting shift button 55 may exchange the lower case symbol menu with an upper case symbol menu, or the English letters with the letters of the Hebrew alphabet. Gesturing may also be used to change a symbol menu. For example, simultaneously pushing both hands forward, optionally with an upward motion may change a symbol menu.

It is noted that text banner 54 as shown in FIGS. 1A and 1B has a limited capacity to display text, and to keep track of lengthy texts entered into computer 70 more text display area may be advantageous. To provide additional text display area in accordance with an embodiment of the invention, at least a portion of GUI 50, may be changed or moved. For example, a gesture comprising bringing the hands together may diminish a portion GUI 50 to make additional space on screen 40 available for text display. Moving the hands apart may be used to expand the portion of GUI 50 to optionally restore the portion to a maximum size. Alternatively or additionally, lifting and down-pressing gestures with both hands may be used to change the location of GUI 50 on screen 40 or move the GUI partially off screen 40 and return it to the screen.

FIG. 2A schematically shows user 100 bringing his hands 101 and 102 together to diminish a portion of GUI 50 on screen 40 and make additional space available for text, schematically represented by a random string 60 of symbols. FIG. 2B schematically shows user 100 lifting both hands 101 and 102 to push a portion of GUI 50 partially off of screen 40 to make space available for random string 60.

In an embodiment of the invention, GRS 20 is operable in a manual controller operating mode, in which symbols are selected from symbol pods 51 and entered into computer 70 using a manual controller. FIG. 3 schematically shows user 100, represented by his hands 101 and 102, interacting with GRS 20 using an optionally wireless video game manual controller 200 to send control signals to GRS 20 to select a letter from a symbol pod 51 and enter the letter into computer 70, in accordance with an embodiment of the invention.

In the manual controller operating mode, GRS controller 22 optionally configures features of GUI 50 to adapt to features of manual controller 200. For example, manual controller 200 optionally comprises four select buttons 204 arranged in a "diamond" shaped array, and GRS controller 22 configures GUI 50 to have a corresponding diamond shaped array 56 comprising three symbol tokens 52 and a "back button" 57 for reversing an action mediated by operation of manual controller 200.

In an embodiment, to enter a letter into computer 70, user 100 operates, optionally with his left hand 102, a motion controller 202 comprised in manual controller 200 to steer a cursor 58 on screen 40 to a symbol pod 51 containing the letter he wants. When the cursor is sufficiently close to indicate the desired symbol pod 51, the letters in the symbol pod appear in symbol tokens 52. User 100 presses a select button 204 homologous with symbol token 52 containing the letter he wants to select and enter the desired letter into computer 70.

In FIG. 3 by way of example, the letter "u" is schematically shown being selected for entering into computer 70. Cursor 58 has been moved to contact symbol pod 51 containing the letters "s", "t", and "u", which as shown in FIG. 3 is optionally highlighted upon selection, and the letters in the selected symbol pod 51 are presented in symbol tokens 52. Optionally, with right hand 101, user 100 (not shown in FIG. 3) presses select button 204 homologous with symbol token 52 comprising the letter u to select and enter the letter u into computer 70. Upon selection, u appears in text banner 54.

Whereas in the above description GRS 20 comprises a GUI 50 having three symbol tokens 52 and nine symbol pods 51 each containing three symbols, a GRS in accordance with an embodiment of the invention is not limited to having three symbol tokens, nine symbol pods, or having symbol pods comprising three symbols.

Figure 4:
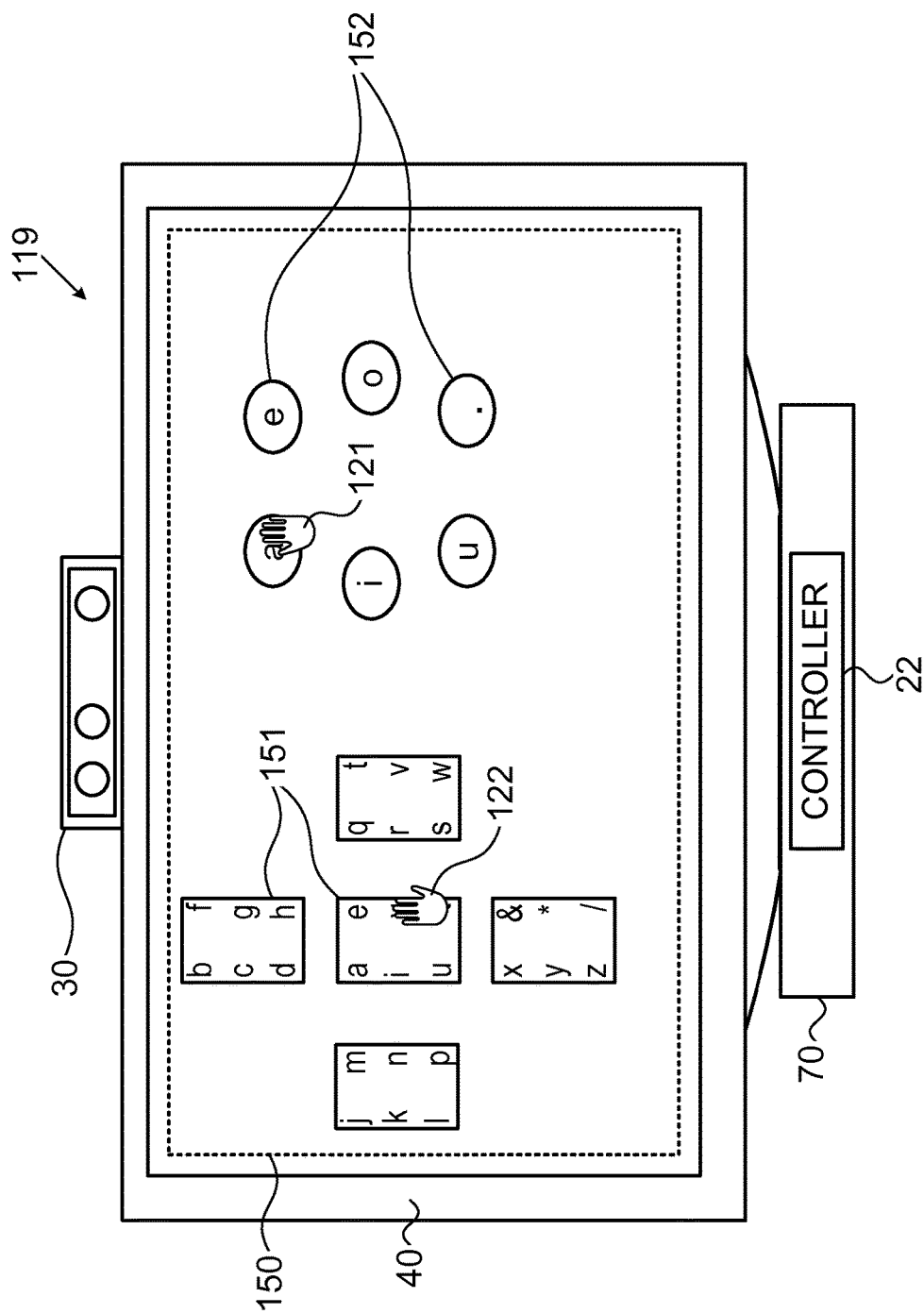
FIG. 4 schematically shows a user controlling a GRS to enter text into a computer by gesturing, in accordance with an embodiment of the invention.

By way of example, FIG. 4 schematically shows a GUI 150 generated by a GRS 119 for entering symbols into a computer 70 by gesturing, in accordance with an embodiment of the invention. GUI 150 optionally comprises five symbol pods 151 containing six symbols each, and six symbol tokens 152. GUI 150 provides right and left hand icons 121 and 122 respectively to aid a user in selecting symbols for entry into a computer.

A given symbol may be selected for entry into computer 70 by gesturing to move left hand icon 122 to select a symbol pod 151 containing the given symbol and place each of the six symbols in the selected pod 151 in a different token 152. The given symbol may be selected and entered into the computer by moving right hand icon 121, optionally with the right hand, to select token 152 containing the given symbol, and after selecting the token optionally closing and opening the right hand. In FIG. 4 the user is selecting the letter "a".

In the description and claims of the present application, each of the verbs, "comprise", "include", "contain", and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A gesture recognition system (GRS) for interfacing a user with a computer, the gesture recognition system comprising:
   an imaging system that acquires images of a user;
   a display screen; and
   a GRS controller configured to generate displays on the display screen based on images of the user acquired by the imaging system, the GRS controller configured to:
   generate a first display comprising a plurality of symbol pods, each symbol pod comprising a plurality of symbols;
   process images of the user acquired by the imaging system to determine a first spatial location of at least one hand of the user that identifies a particular symbol pod of the plurality of symbol pods;
   while displaying the plurality of symbol pods on the display screen, generate a second display based on the determined first spatial location comprising a plurality of tokens and dedicated deposit slots, located outside of and non-overlapping with the particular symbol pod, wherein a different token represents each symbol in the particular symbol pod, and is assigned to a different dedicated deposit slot, wherein a number of the plurality of tokens is equal to a number of the dedicated deposit slots, and is also equal to a number of symbols in the particular symbol pod;

process images of the user acquired by the imaging system to determine a second spatial location of at least one hand of the user that identifies from among the tokens comprised in the second display a token of a desired symbol for entering into the computer;

process images acquired by the imaging system to recognize a motion of the at least one hand that simulates depositing the token comprising the desired symbol identified by the second spatial location into the dedicated deposit slot; and enter the desired symbol into the computer if such a motion is recognized.

2. The gesture recognition system according to claim 1 wherein each of the symbol pods comprises three symbols.

3. The gesture recognition system according to claim 1 wherein a symbol pod of the plurality of symbol pods comprises a shift button and if the shift button is selected, the GRS controller replaces symbols in at least one of the symbol pods with different symbols.

4. The gesture recognition system according to claim 1 wherein the first and/or second display comprises a text banner for displaying symbols entered into the computer.

5. The gesture recognition system according to claim 1 wherein the GRS controller processes images acquired by the imaging systems to recognize a motion of the at least one hand that simulates shrinking or expanding a portion of the first and/or second display, and respectively shrinks or expands the portion if the motion is recognized.

6. The gesture recognition system according to claim 1 wherein the GRS controller processes images acquire by the imaging systems to recognize a motion of the at least one hand that simulates moving a portion of the first and/or second display and moves the portion if the motion is recognized.

7. The gesture recognition system according to claim 1 wherein the gesture recognition system is configured to receive control signals from a manual controller and to identify a symbol pod comprising a desired symbol to be entered into the computer and to select the desired symbol responsive to the control signals.

8. The gesture recognition system of claim 1, wherein each token is visually associated with its dedicated deposit slot by an indicium.

9. A method of interfacing a user with a computer, the method comprising:

providing a display comprising a plurality of symbol pods, each symbol pod comprising a plurality of symbols on a display screen;

determining spatial locations for at least one hand of the user from images of the user;

identifying a particular symbol pod of the plurality of symbol pods responsive to determining a first spatial location of the at least one hand;

while displaying the plurality of symbol pods on the display screen, generating a second display based on the determined first spatial location comprising a plurality of tokens and dedicated deposit slots, located outside of and non-overlapping with the particular symbol pod, wherein a different token represents each symbol in the particular symbol pod, and is assigned to a different dedicated deposit slot, wherein a number of the plurality of tokens is equal to a number of the dedicated deposit slots and is also equal to a number of symbols in the particular symbol pod;

determining a second spatial location of the at least one hand that identifies from among the displayed tokens a token of a desired symbol for entering into the computer;

determining, based on images of the user, if the at least one hand simulates depositing the token comprising the desired symbol into the token's dedicated deposit slot and if so, entering the symbol into the computer.

10. The method of claim 9, wherein each token is visually associated with its dedicated deposit slot by an indicium.

11. A graphical user interface for interfacing a user with a computer, the graphical user interface comprising:

a display screen; and a graphics display for display on the display screen, the graphics display comprising:

a plurality of user selectable symbol pods, each symbol pod comprising a plurality of symbols for entering into a computer; and a plurality of tokens and dedicated deposit slots, located outside of and non-overlapping with a user selected symbol pod, wherein:

a token of the plurality of tokens represents each symbol in the user selected symbol pod and is assigned to a different dedicated deposit slot;

a number of the plurality of tokens is equal to a number of the dedicated deposit slots and is also equal to a number of symbols in the particular symbol pod;

wherein a symbol pod of the plurality of symbol pods is selected by acquiring images of a motion of at least one hand of the user that identifies the selected symbol pod, and a token is deposited by a user into its dedicated deposit slot by acquiring images of a motion of at least one hand of the user that simulates depositing the token into its dedicated deposit slot, and the symbol in the token is entered into the computer if such a motion is recognized.

12. The graphical user interface according to claim 11 controllable by user hand motions that do not involve contact with a screen or use of a manual controller.

13. The graphical user interface of claim 11, wherein each token is visually associated with its dedicated deposit slot by an indicium.

* * * * *